United States Patent
Chevalier

(10) Patent No.: US 6,866,223 B2
(45) Date of Patent: Mar. 15, 2005

(54) PROCESS FOR FORMING A SECTOR OF AN AIR INTAKE LIP, DEVICE FOR PRACTICING THE SAME, AND SECTOR THUS OBTAINED

(75) Inventor: Lucien Chevalier, La Chapelle Launay (FR)

(73) Assignee: Airbus France, Toulouse (FR)

( * ) Notice: Subject to any disclaimer, the term of this patent is extended or adjusted under 35 U.S.C. 154(b) by 162 days.

(21) Appl. No.: 10/390,908

(22) Filed: Mar. 19, 2003

(65) Prior Publication Data

US 2003/0178529 A1 Sep. 25, 2003

(30) Foreign Application Priority Data

Mar. 20, 2002 (FR) .............................. 02 03440

(51) Int. Cl.$^7$ ................................. B64C 7/02
(52) U.S. Cl. ..................... 244/53 B; 72/257; 72/260
(58) Field of Search ................... 244/53 B; 164/174; 72/253.1, 255, 256, 257, 260, 264

(56) References Cited

U.S. PATENT DOCUMENTS

| | | | | |
|---|---|---|---|---|
| 2,133,874 A | * | 10/1938 | Sparks | ..................... 72/128 |
| 2,591,062 A | * | 4/1952 | Gillett | ..................... 29/747 |
| 4,458,863 A | * | 7/1984 | Smith | ..................... 244/54 |
| 5,305,626 A | * | 4/1994 | Tiekink | ..................... 72/257 |
| 5,600,990 A | * | 2/1997 | Kelly et al. | ..................... 72/255 |
| 6,328,258 B1 | * | 12/2001 | Porte | ..................... 244/53 B |

* cited by examiner

Primary Examiner—Robert P. Swiatek
(74) Attorney, Agent, or Firm—Young & Thompson

(57) ABSTRACT

The object of the invention is a process for forming sectors of the air intake lip of an aircraft nacelle, of U-shaped cross-section, characterized in that it comprises producing, from a cylindrical billet (11) of a suitable material, by hot die pressing, a tubular profile (12) of U-shaped cross-section whose ends are interconnected, a portion of the section formed by the U having a development less by several percent than the development of the smallest cross-section of the lip sector to be obtained, in giving to the profile (12) at the outlet of the die (15) a curvature whose radius is substantially equal to the mean radius of said sector, then in forming and calibrating the profile (12) to the final shapes of the sector by hydraulic expansion in a matrix whose interior corresponds to the external volume of said sector increased by the resilient return of the material to be expanded, and finally, cutting off the tubular product thus formed to separate the portion of U-shaped cross-section constituting said lip sector.

11 Claims, 4 Drawing Sheets

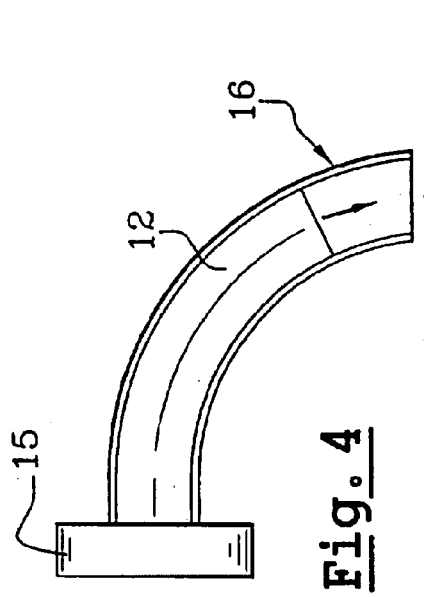
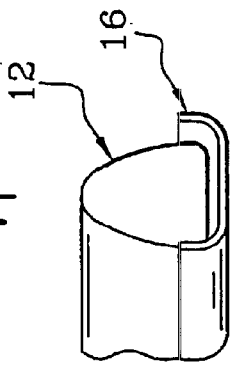
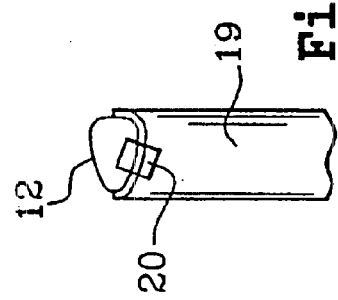
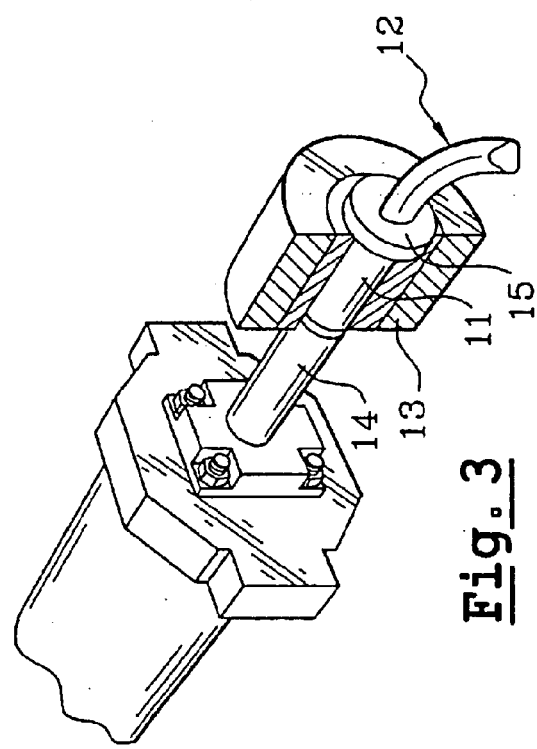
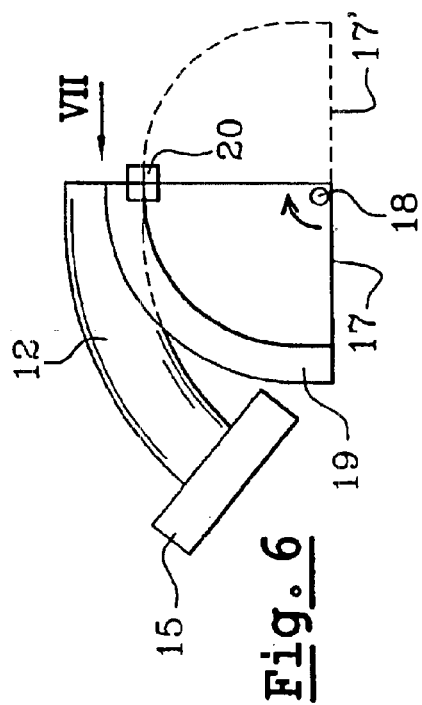

PROCESS FOR FORMING A SECTOR OF AN AIR INTAKE LIP, DEVICE FOR PRACTICING THE SAME, AND SECTOR THUS OBTAINED

The present invention relates to the production of air intake lips of nacelles containing the motor propulsion group, particularly a reaction motor, of aircraft.

The nacelles comprise an air intake cowling prolonged forwardly by a lip having a cross-section of rearwardly open U shape.

This air intake lip ensures the division of the air between the portion which penetrates the fan channel and the portion which flows about the nacelle.

It has an annular shape and is constituted by several sectors or segments connected in abutment by interfitting.

Several techniques are used for the production of such sectors.

Thus there can be used conventional cold stamping with the help of a die, a punch and a blank holder permitting by a certain number of passes the shaping of a suitable metal blank, generally an aluminum base alloy, in the mold.

This well-known and widespread technique has the drawback of the need for numerous passes with intermediate thermal treatments and gives rise to a resulting loss of thickness of the blank in the course of stamping.

Stamping with the help of a bladder can also be used. It consists in inflating a bladder to be deformed and winding about a punch in the form of a tensioned strip, the operation taking place in several passes with intermediate thermal treatments.

Relative to the preceding stamping, the number of passes is however reduced as well as the loss of thickness of the sheet.

However, the final shape is not acquired because of substantial resilient recovery and requires a tensioning of the workpiece on another tool. Tooling thus used is costly.

According to another possible technique, embossing, a tool carrier with a jack is used to form the false round of the shape of the lip. If the tooling in this case is simple and of reduced cost and leads to good control of the thickness, there is a limit to the production of air intakes of which the blank is capable of being contained in a sheet. Moreover, this technique gives rise to an important drop in the strength of caulking, requiring substantial inspection and maintenance in use.

Hot forming by a diaphragm is also envisagable. The sheet to be formed is disposed on a shaped punch and caused to mate with this latter under the pressure of a sheet, trade named SPF ("Super Plastic Forming").

A single pass is necessary but several drawbacks arise, connected to the random control of the shape after thermal treatment, whereupon it is desirable to use shaped tooling and the repetitivity of the process is uncertain.

Finally, the so-called "Super Plastic Forming" could be used consisting of constraining a sheet of SPF material brought to the temperature to mate with a shaped punch, but the principal drawback is that no light alloy with known SPF properties has the required characteristics for making an air intake lip.

The invention has for its object to overcome these various drawbacks of the known techniques by providing a new technique for forming sectors of an air intake lip, which will be at the same time simple, rapid to use, of reduced cost and providing homogeneous pieces of very high strength.

To this end, the invention has for its object a process for forming sectors of an air intake lip of an aircraft nacelle, of U shaped cross-section, characterized in that it consists:

in forming, from a cylindrical billet of a suitable material, by hot pressure drawing, a tubular profile of U shaped cross-section whose ends are connected together, the portion of the section formed by the U having a development less by several percent than the development of smallest cross-section of the section of the lip to be obtained, giving to the profile at the outlet of the die a curvature whose radius is substantially equal to the mean radius of curvature of said sector, then forming and calibrating the profile to the final shapes of the sector by—hydraulic expansion in a matrix whose interior corresponds to the external volume of said sector increased by the resilient return of the material to be expanded, and finally, cutting off the tubular product thus formed to isolate the portion of U shaped cross-section constituting said lip sector.

The curvature of the tubular profile at the outlet of the die is ensured by differential downstream control in the material passage of the die, the conservation of the curvature after leaving the die being ensured either by a fixed guide device bent to the desired radius, or by an exit of the profile onto a rotating plate provided with a form.

Such a process has numerous and substantial advantages.

First of all, the physical characteristics of the obtained piece are improved by the selective direction of the fiber of the material due to drawing, parallel to the axis of the sector of the lip.

Moreover, the shaping in a single operation, with homogeneous elongation, controlled and substantially constant over all the surface of the piece gives rise to:

a favorable strength and resistance to crack formation, a constant thickness of the piece after forming, facilitated chemical machining (no disparity of structure in the material), homogeneity of the grain of the material, guaranteeing a constant appearance over all the surface of the piece after sulfuric anodic oxidation, whilst all the techniques of forming from a sheet, on the contrary, give rise to disparities of stress which manifest themselves in differences of appearance after surface treatment.

Finally, the limitation of the number of phases to obtain the piece permits a substantial reduction in the cost of the pieces.

The invention also has for its object a device for practicing the above process, as well as the air intake lip sectors obtained according to the process.

Other characteristics and advantages will become apparent from the description which follows, of an embodiment of the process according to the invention, which description is given solely by way of example and with respect to the accompanying drawings, in which:

FIG. 3 is a schematic perspective view of an extrusion-die head in the course of die forming of a tubular profile according to the process of the invention;

FIG. 4 is a view from above of a fixed device for curving the profile at the outlet of the die;

FIG. 5 is an end view in the direction of the arrow V of the device of FIG. 4;

FIG. 6 is a view from above of a curving device of the die-formed profile at the outlet of the die, constituting a rotatable shaped plate;

FIG. 7 is an end view in the direction of the arrow VII of the device of FIG. 6;

Figure 1:
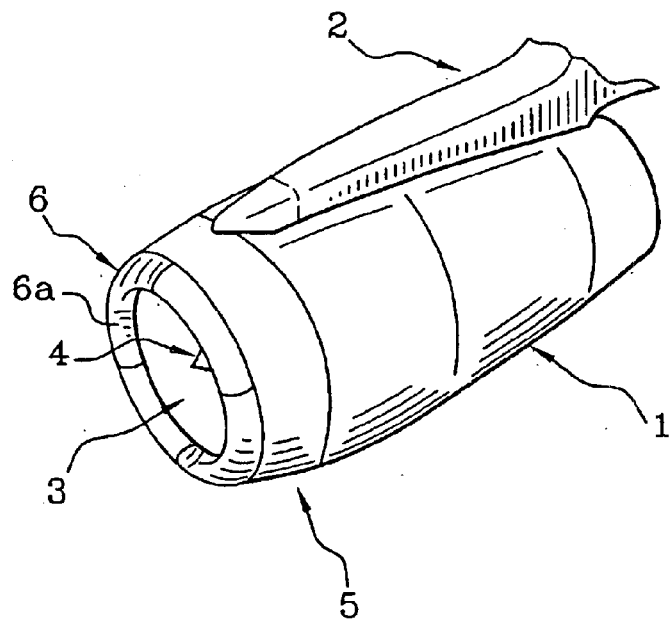
FIG. 1 is a schematic perspective view of an aircraft reaction motor.

There is shown in FIG. 1 an aircraft turboreactor comprising a nacelle 1 coaxially surrounding the motor properly so called and fixed for example to a wing (not shown) of the aircraft by means of a mast generally designated by the reference numeral 2.

The nacelle 1 has an annular cross-section and defines between it and the central portion of the motor an annular channel called a fan channel. There is shown at 4 in the figure, the nose of ogival shape of the fan driven by the motor and which is disposed at the inlet of the channel.

The front portion of the nacelle defines an air intake cowling 5 which has the function of ensuring the aerodynamic flow of the air, on the one hand, toward the fan channel 3 and, on the other hand, toward the exterior of the nacelle 1.

Figure 2:
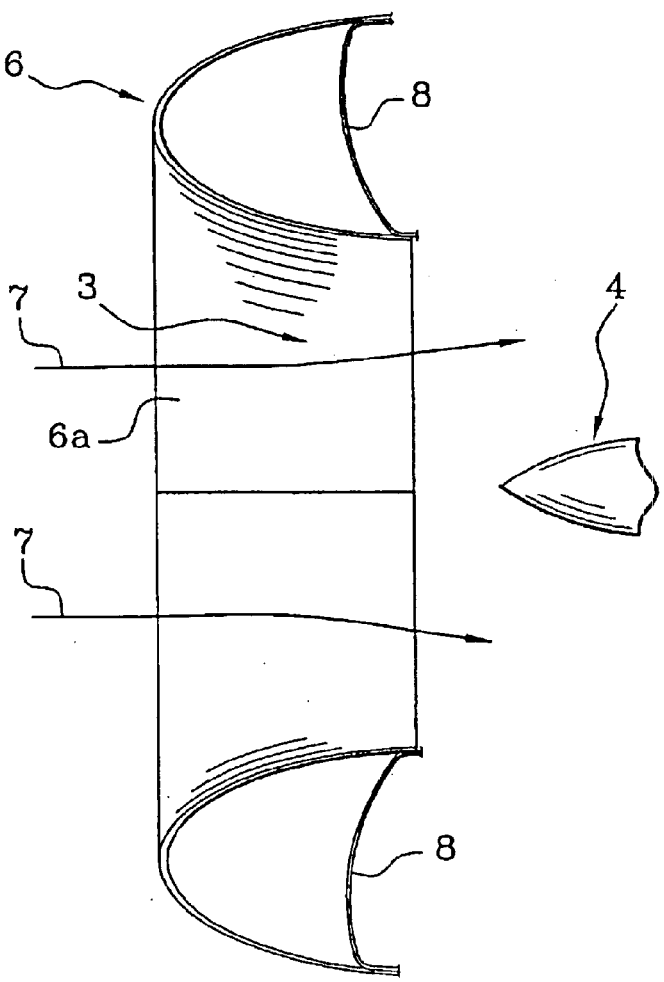
FIG. 2 is an axial cross-sectional view of the air intake lip of the motor of FIG. 1.

As can be seen in FIG. 2, which is a fragmentary axial cross-section of the cowling 5, this latter is prolonged forwardly by an air intake lip 6 having a rearwardly open U shaped cross-section. This lip ensures the division of the air between the portion 7 which enters the fan channel and the portion which flows about the nacelle.

The rear of the lip 6 is formed by an internal partition 8.

As shown in FIGS. 11 and 2, the lip 6 is generally constituted by four sectors or segments such as the sector 6a, abuttingly interfitting to form a complete ring.

The invention seeks to provide a lip sector such as the sector 6a.

To this end, according to the invention, one proceeds from a cylindrical billet shown at 11 in FIG. 3, of suitable material, in this case a specific aluminum alloy, to produce by die pressing a curved tubular profile schematically shown at 12 in FIG. 3.

The die extrusion device used is conventional and is shown very schematically in FIG. 3 by a container 13 into which is introduced the billet 11 pressed by a presser ram 14, and a die 15 secured to the outlet surface of the container 13.

Die forming is carried out hot, with the help of a die 15 with a core, particularly by preheating the billet 11 to the annealing temperature of the material, which in this instance is between 400 and 450° C. by way of example.

Figure 8:
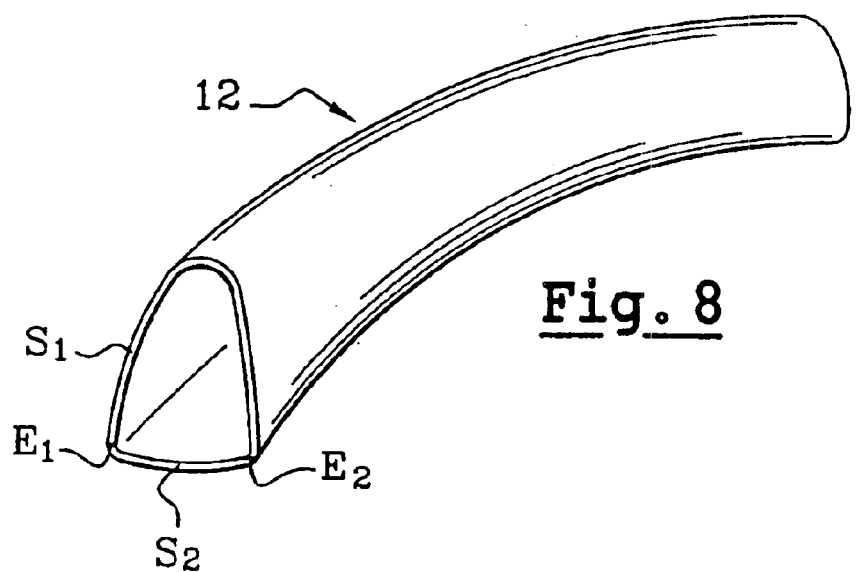
FIG. 8 is a perspective view of a curved profile issuing from the die.

The die-cast product 12 is tubular, its cross-section being shown in FIG. 8. This cross-section comprises a portion S1 of reversed U shape in FIG. 8, corresponding to the lip to be obtained, and a web S2 connecting the ends E1, E2 of the legs of the U.

The die 15 is so designed that the cross-section of the profile 12, which is constant, has a development which is slightly less, by about 2 to 3%, than the development of the smallest cross-section of the sector of the lip to be obtained, it being understood that an air intake lip is never a toric element of constant section, nor of constant radius of curvature. This is why the radius of curvature given to the profile 12 at the outlet of the die will be substantially equal to the mean radius of curvature of the sector of the lip to be obtained.

The curvature given to the profile 12 is formed about an axis substantially orthogonal to the general plane of the web S2, which is to say to the plane containing the ends E1, E2 of the sections of the profile 12.

The curvature of the die-formed product is obtained for example simply by adjusting the downstream portions of the material passage of the die 15, which is to say by offering to the material a passage cross-section within the die which is greater for one leg of the U section than for the other, such that the die-formed product will bend from the narrower side of the die.

This bending is then channeled by a device for curving the product 12.

FIGS. 4 and 5 show a device suitable for this result and constituted by a simple fixed guide trough 16 mounted at the outlet of the die 15 and suitably curved.

The length of the trough 16 depends on that of the sectors to be obtained and, in the present case, is slightly greater than a quarter of the circumference.

FIGS. 6 and 7 show another device for obtaining the same result and constituted by a plate 17 mounted rotatably about a vertical axle 18 and carrying a bent guide trough 19. The trough 19 has a curvature corresponding to that to be given to the die-formed product 12 and has a length, in the present case, slightly greater than a quarter of the circumference.

Moreover, the trough 19 is curved so as to match the product 8 on one of its sides as shown in FIG. 7, so as to give to the product the desired curvature by rotation about the axle 18.

There is shown symbolically at 20 a gripper secured to one of the ends of the trough 19 and adapted to grip and hold in place the front end of the product 12 at the outlet of the die 15. At 17' is schematically shown the final position of the rotatable plate 17 corresponding to a length of incurved product 12 of a quarter of the circumference.

In FIGS. 4 to 7, there have not been shown the sectioning means for the die-formed product 12 to obtain sectors of a quarter of the circumference such as that of FIG. 8.

Figure 9:
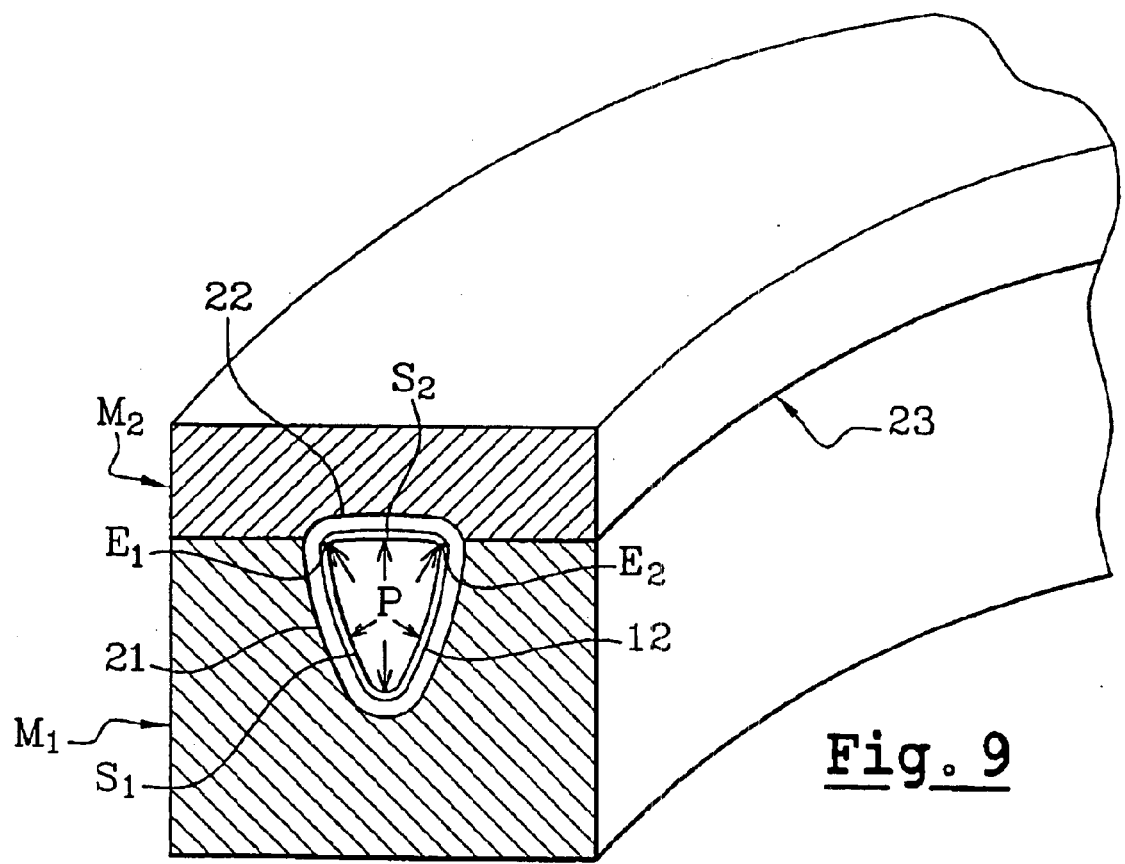
FIG. 9 is a schematic view of a forming-calibrating matrix for the curved profile.

In a second step of the process of the invention, the sector 12 of FIG. 8 is disposed in a curved matrix for forming and calibration in two portions, shown in FIG. 9.

The matrix comprises a portion M1 comprising a recess 21 receiving the portion S1 of the cross-section of the profile 12 of FIG. 8.

The impression 21 of the matrix M1 is closed by a matrix M2 comprising an impression 22 corresponding to the web S2 of the profile 12, the ends E1, E2 of the legs of the U of the section of the profile 2 being located substantially at the height of the joint plane 23 of the two matrix portions M1, M2.

As can be seen in FIG. 9, which shows the profile 12 in place in the matrix before sending a hydraulic fluid under pressure P within the profile, there exists an interval between the external wall of the profile 12 and the recess 21, 22. The role of the fluid under pressure P which is for example of the order of 400 to 500 bars, is to press the wall of the profile 12 against the recesses.

The volume defined in particular by the recess 21 corresponds to the external volume of the sector of the lip to be obtained, increased by the elastic return of the expanded material of the profile 12.

Figure 10:
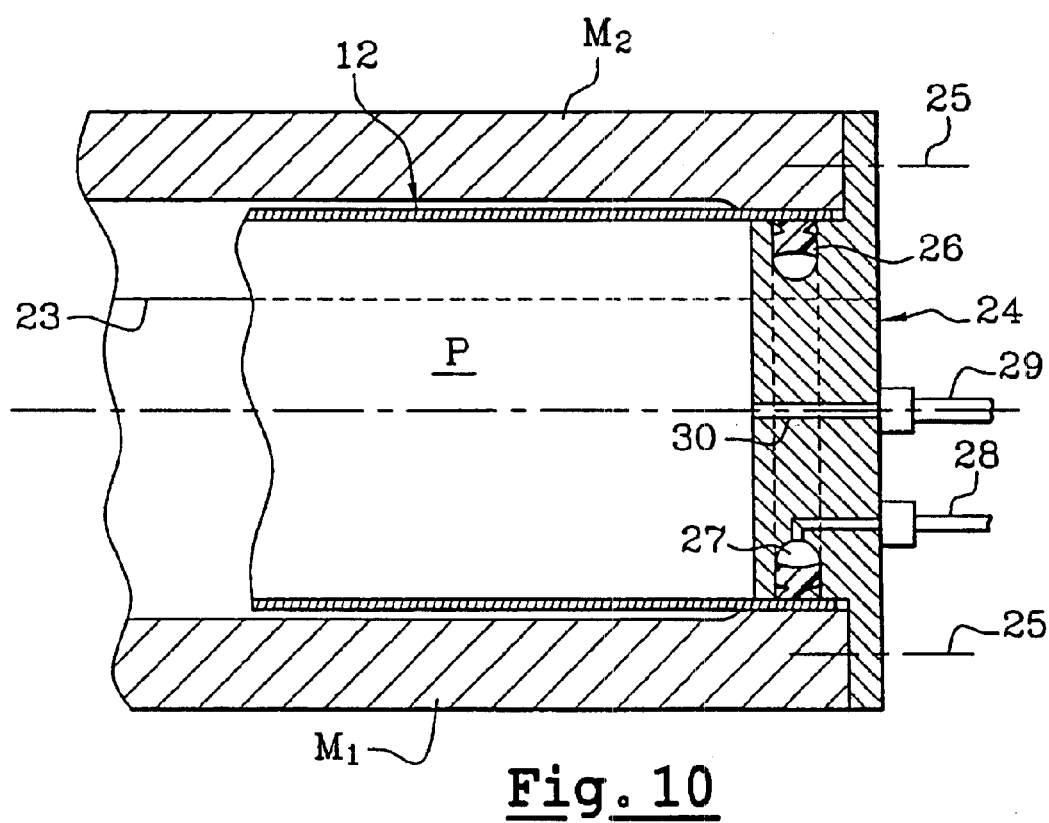
FIG. 10 is a fragmentary cross-sectional view of one end of the matrix of FIG. 9.

FIG. 10 shows one of the ends of the matrix which is open at its two ends and receives a closure device constituted by a closure plate 24 removably fixed at 25 on the two portions of the matrix M1, M2.

Each end of the profile 12 is held pressed against the internal wall of the matrix M1, M2 with the help of an annular joint 26 pressed by a fluid under suitable pressure conveyed through in an annular throat 27 by a channel 28, whereas the pressure P within the profile 12 is applied by a hydraulic fluid supplied by a channel 29 and a hole 30 passing through one of the plates 24.

At the outlet of the matrix, the profile 12, which has taken the desired shape of the sector of the lip, is cut off to size, both at the two ends and in line with the reference characters E1 and E2 delimiting the end edge of the legs of the U of the lip, over all the length of the sector which is thus exactly of the desired shape and size.

The process is of course adaptable to the production of sectors less than or greater than 90°, it suffices to adapt the tools (curving device for the profile at the outlet of the die and calibrated forming matrix) accordingly.

What is claimed is:

1. Process for forming sectors of an air intake lip of an aircraft nacelle, of U-shaped transverse cross-section, characterized in that it consists in producing, from a cylindrical billet (11) of a suitable material, by hot die pressing, a tubular profile (12) of U-shaped transverse cross-section whose ends are interconnected, a portion of U-shaped section (S1) having a development less by several percent than the development of the smallest cross-section of the sector of lip to be obtained, giving to the profile (12) at the outlet of the die (15) a curvature whose radius is substantially equal to the mean radius of curvature of said sector, then forming and calibrating the profile (12) to the final shapes of the sector by hydraulic expansion in a matrix (M1, M2) whose interior corresponds to the external volume of said sector increased by the resilient return of the material to be expanded, and finally, cutting off the tubular product thus obtained to separate the U-shaped transverse cross-section portion constituting said lip sector.

2. Process according to claim 1, characterized in that the curvature of the tubular profile (12) at the outlet of the die (15) is achieved by downstream control of the passage of the material from the die, the preservation of the curvature after leaving the die being effected by a suitable guide device.

3. Air inlet lip sector obtained according to the process of claim 2.

4. Device for practicing the process according to claim 1, characterized in that it comprises:

an extrusion die device (13 to 15), means (16; 17 to 20) arranged at the outlet of the die (15) to give to the die-formed product (12) a suitable curvature, and a matrix for calibrated forming of said die-formed product (12).

5. Device according to claim 4, characterized in that said means for curving the die-formed product (12) are constituted by a fixed bent guide trough (16).

6. Device according to claim 5, characterized in that the matrix is in two parts (M1, M2), one part (M1) comprising a recess (21) corresponding to the U-shaped cross-section portion (S1) of the tubular die-formed product (12) and the other portion (M2) comprising a recess (22) corresponding to the remaining cross-sectional portion (S2) of said product (12).

7. Device according to claim 4, characterized in that said means for curving the die-formed product (12) are constituted by a rotatable plate (17) carrying a bent guide trough (19) whose shape matches the flank of the die-formed product (12) and which is provided at one end with a gripper (20) for gripping the front end of said die-formed product.

8. Device according to claim 7, characterized in that the matrix is in two parts (M1, M2), one part (M1) comprising a recess (21) corresponding to the U-shaped cross-section portion (S1) of the tubular die-formed product (12) and the other portion (M2) comprising a recess (22) corresponding to the remaining cross-sectional portion (S2) of said product (12).

9. Device according to claim 4, characterized in that the matrix is in two parts (M1, M2), one part (M1) comprising a recess (21) corresponding to the U-shaped cross-section portion (S1) of the tubular die-formed product (12) and the other portion (M2) comprising a recess (22) corresponding to the remaining cross-sectional portion (52) of said product (12).

10. Device according to claim 9, characterized in that the two portions of the assembled matrix (M1, M2) are closed at the ends by a plug plate (24) for gripping the ends of the die-formed product (12) to be expanded, one of the plates being provided with a conduit (30) for introduction of a hydraulic fluid under pressure within said product (12).

11. Air inlet lip sector obtained according to the process of claim 1.

* * * * *